United States Patent [19]
Yamanaka

[11] Patent Number: 5,930,213
[45] Date of Patent: Jul. 27, 1999

[54] SPOT POSITION-DISCRIMINATING SYSTEM AND METHOD FOR DISCRIMINATING SPOT POSITION

[75] Inventor: Yutaka Yamanaka, Tokyo, Japan

[73] Assignee: NEC Corporation, Tokyo, Japan

[21] Appl. No.: 08/979,178

[22] Filed: Nov. 26, 1997

[30] Foreign Application Priority Data

Nov. 29, 1996 [JP] Japan .................................. 8-334905

[51] Int. Cl.$^6$ ..................................................... G11B 7/09
[52] U.S. Cl. ........................................... 369/54; 369/44.41
[58] Field of Search ........................... 369/54, 58, 44.27, 369/44.26, 44.41, 44.29, 44.28

[56] References Cited

U.S. PATENT DOCUMENTS

| | | | |
|---|---|---|---|
| 5,278,401 | 1/1994 | Takishima et al. | 250/201.5 |
| 5,459,705 | 10/1995 | Matoba et al. | 369/44.28 |
| 5,504,725 | 4/1996 | Katsumata | 369/44.28 |
| 5,734,633 | 3/1998 | Aoki et al. | 369/44.26 |
| 5,784,347 | 7/1998 | Miyamoto et al. | 369/54 |

FOREIGN PATENT DOCUMENTS

| | | |
|---|---|---|
| 0751504 | 1/1997 | European Pat. Off. . |
| 19520640 | 1/1996 | Germany . |
| 4-19831 | 1/1992 | Japan . |

OTHER PUBLICATIONS

Patent Abstracts of Japan; vol. 095, No. 006, Jul. 31, 1995 & JP 07 057279 A (Ricoh Co. Ltd.), Mar. 3, 1995, abstract.

*Primary Examiner*—Thang V. Tran
*Attorney, Agent, or Firm*—Sughrue, Mion, Zinn, Macpeak & Seas, PLLC

[57] ABSTRACT

It is an objection of the invention to provide a rewritable optical disk system, which can discriminate the position of a spot on an optical disk by detecting the difference in a intensity distribution of a reflected light from the optical disk between a land track and a groove track. The spot positions detected by partially detecting the intensity distribution of the reflected light in a condition that the spot on the optical disk is lightly defocused, and thereby the difference in the intensity distribution of a reflected light between the land and groove tracks can be discriminated.

4 Claims, 8 Drawing Sheets

SPOT POSITION-DISCRIMINATING SYSTEM AND METHOD FOR DISCRIMINATING SPOT POSITION

FIELD OF THE INVENTION

The invention relates to a system and a method for discriminating the position of a spot focussed on an optical disk, and especially the system and the method for discriminating the position of the spot on the optical disk suited for an apparatus for optically recording and reproducing information on the optical disk.

BACKGROUND OF THE INVENTION

In most of a conventional rewritable optical disk system, a guiding groove for guiding a focussed light is provided on an optical disk, a focussed light is guided along the guiding groove and information is recorded and reproduced on the optical disk.

The surface of the rewritable optical disk system is provided with two track, one is a groove track and the other is a land track, where the aforementioned guiding groove serves as the groove track and the land track is positioned between the adjacent groove tracks. An information-recording track is formed along the center line of either the land track on the groove track. The objective lens mounted on an optical head focuses a laser light on the surface of the optical disk to form a spot thereon. The objective lens is driven in both the focussing and tracking directions by a servo control system in order to follow vertical deviation and eccentricity of the optical disk. In order to achieve stable servo characteristic, the optical disk system must discriminate whether the spot is on the land or groove track. Since the widths of the land and groove tracks are different from each other, the total reflected light from the optical disk varies in a sinusoidal fashion around a certain constant, as the spot moves in the tracking direction. The rewritable optical disk system can discriminate whether the spot is on the land or groove track in reference to the total reflected light. However, if the widths of the land and groove tracks are equal to each other, the total reflected light becomes independent of the position of the spot and the aforementioned method is not successful.

Viewed from the another angle, if the rewritable optical disk system, which can discriminate whether the spot is on the land or groove track in case that the widths of both the track are the same, both the land and groove tracks can be used as the information recording tracks and optical data stored in the rewritable disk can be doubled.

SUMMARY OF THE INVENTION

Accordingly, it is an object of the invention to provided a spot position discriminating system which can discriminate whether the spot is on a land track or a groove track, even when widths of the land and groove tracks are the same.

It is a further object of the invention to provide a method for discriminating a spot position, which can discriminate whether the spot is on a land track or a groove track, even when widths of the land and groove tracks are the same.

According to the first feature of the invention, a spot position discriminating system comprises:

means for forming a spot by focussing a laser light on an optical disk provided with a guiding groove by means of an objective lens, a light detector for partially detecting a light in a cross-section of a reflected light from the optical disk in a condition that the spot on the optical disk is defocused within a range of the depth of a focus of the objective lens, and means for discriminating whether the spot is on a land track or a groove track by detecting a difference in the light detected by the light detector between a land track and a groove track.

According to the second feature of the invention, a method for discriminating spot position comprises the steps of:

arranging a quadrisected light detector close to an optical disk with a guiding groove, the quadrisected light detector being divided into four equal detectors by three lines running in parallel with a direction of the guiding groove, Focussing a spot on the optical disk in a condition that the spot is defocused within a range of the depth of a focus of an objective lens, deriving the first sum signal obtained as a sum of output signals of the two inner divided detectors, deriving the second sum signal obtained as a sum of output signals of the two outer divided detectors, deriving a differential signal obtained as a difference between the first and second sum signals, and discriminating whether the spot is on a land track or a groove track based on the differential signal.

BRIEF DESCRIPTION OF THE DRAWINGS

The invention will be explained in more detail in conjunction with appended drawings, wherein.

DESCRIPTION OF THE PREFERRED EMBODIMENT

Before explaining a spot position discriminating system and a method for discriminating a spot position in the preferred embodiments of the invention, the aforementioned conventional spot position discriminating system will be explained.

Figure 1:
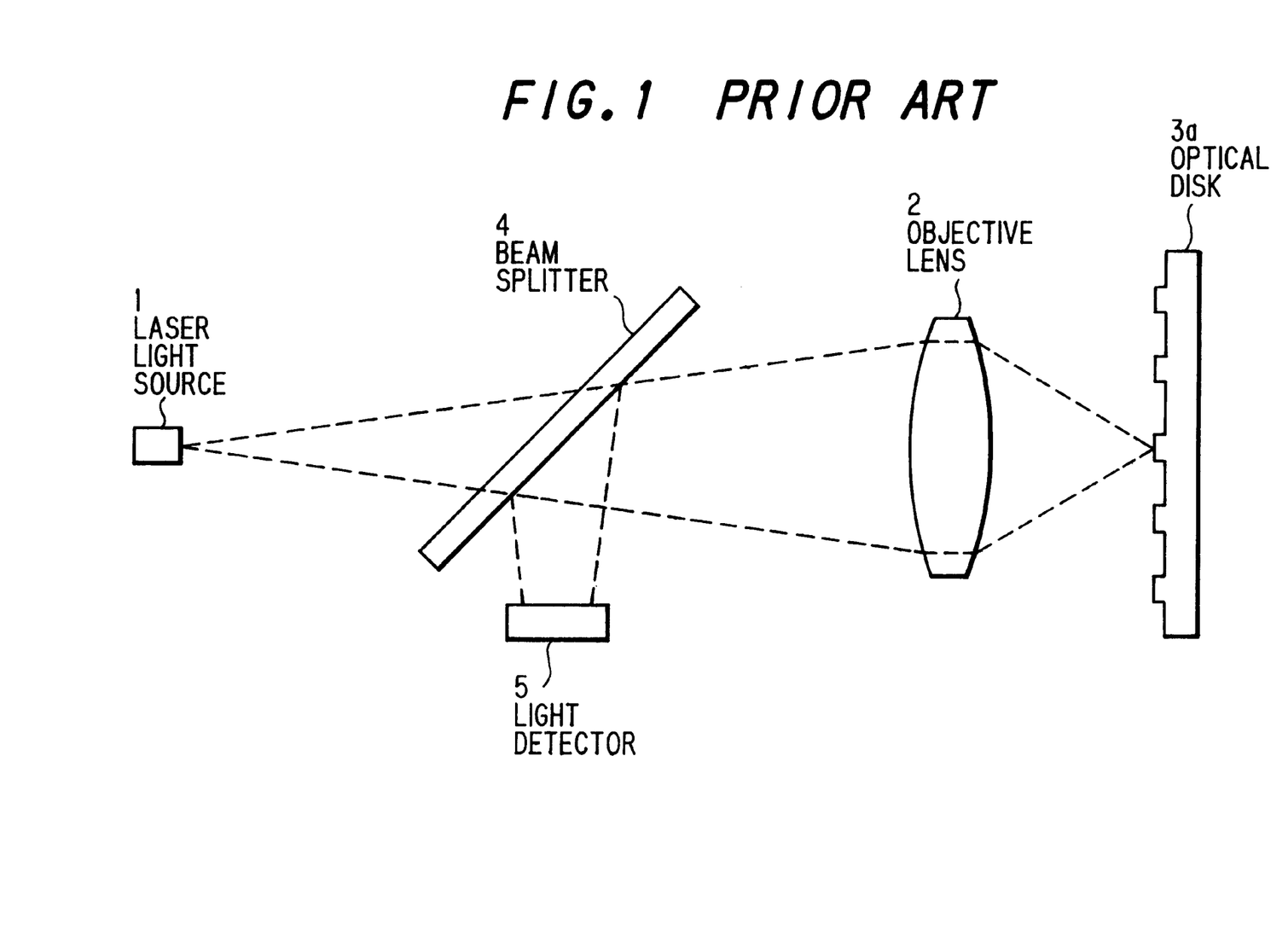
FIG. 1 shows the optical configuration of the optical head used in a conventional rewritable optical disk system.

The optical configuration of an optical head used in the aforementioned system is illustrated by example in FIG. 1. In FIG. 1, a laser light emitted from a laser light source 1 is focussed on an optical disk 3a to form a spot on an optical disk 3a by an objective lens 2. A reflected light from the optical disk 3a is separated by a beam splitter 4 and led to a light detector 5. If a bisected light detector is used as the light detector 5, a tracking error signal can be derived from diffracted lights via the bisected light detector by a push-pull method.

In order to cope with the situation that the spot deviates from its regular position, the objective lens 2 is generally driven in focussing and tracking directions by a servo control system.

In order to achieve a stable servo characteristic, it is indispensable to discriminate whether the spot is on a land track or a groove track.

Figure 2A:
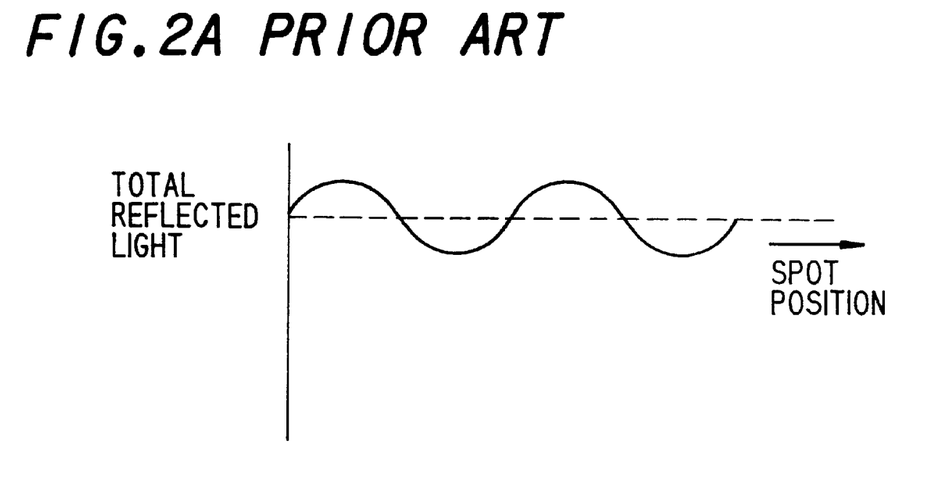
FIGS. 2 and 2B are curves showing signal intensities based on the spot position in the conventional technologies.
Figure 2B:
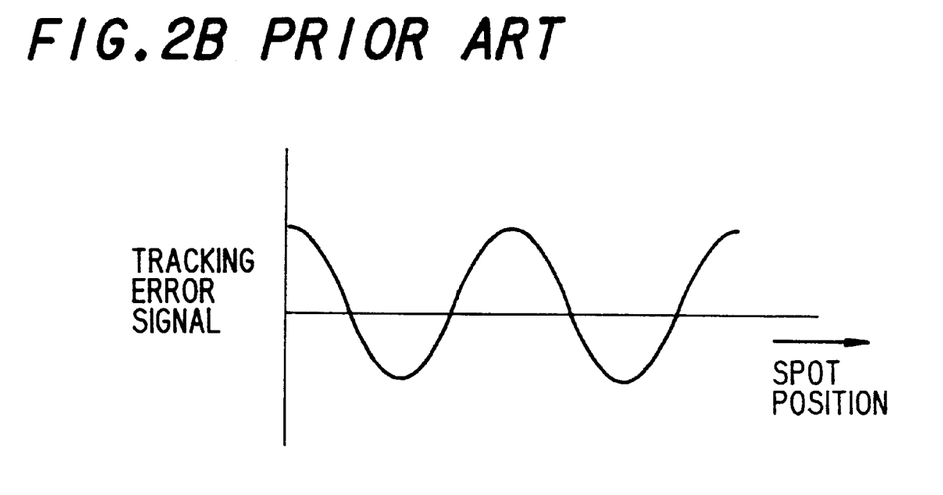

However, as shown in FIG. 2B, when the spot moves in the tracking direction, since the tracking error signal becomes zero on both the center lines of the land and groove tracks, the position of the spot cannot be discriminated based on the tracking error signal.

Accordingly, as shown in FIG. 2A, the position of the spot is discriminated based on a difference in the total reflected light from the optical disk between the land and groove tracks. However, the aforementioned difference in the total reflected light between the land and groove tracks can be observed only in case that the widths of the land and groove tracks are different from each other.

In the conventional rewritable optical disk system, since any one of the land and groove tracks has been used as an information recording track, no incommodity arises in the conventional method for discriminating the position of the spot.

However, in recent years, a proposal is made for the rewritable optical disk system, in which both the land and groove tracks are used as the information recording tracks.

In such a rewritable optical disk system the widths of the land and groove tracks must be equal to each other in order to obtain the same information recording characteristic in both the land and groove tracks.

However, if the widths of the land and groove track are the same, since the total reflected lights becomes independent of the position of the spot as shown in a broken line in FIG. 2A, the position of the spot cannot be discriminated in the conventional rewritable optical system.

The embodiment of the invention will be explained as follows. In the preferred embodiment of the invention, a laser light emitted from a laser light source is concentrated by an objective lens on an optical disk provided with a guiding groove to form a light spot thereon, where the spot on the optical disk is slightly defocused within a range of the depth of a focus of the objective lens. A light detector (shown as 5 in FIG. 3) is mounted on an optical head, which partially detects a light in the cross-section of the reflected light from the spot on the optical disk. Whether the spot is on the land and groove track is discriminated based on a difference in the partially detected light by the light detector between the land and groove tracks.

The principle of the embodiment of the invention will be explained referring to FIGS. 4A to 4C, which respectively show the distributions of the intensities of light diffracted by the guiding groove on the optical disk.

Figure 4A:
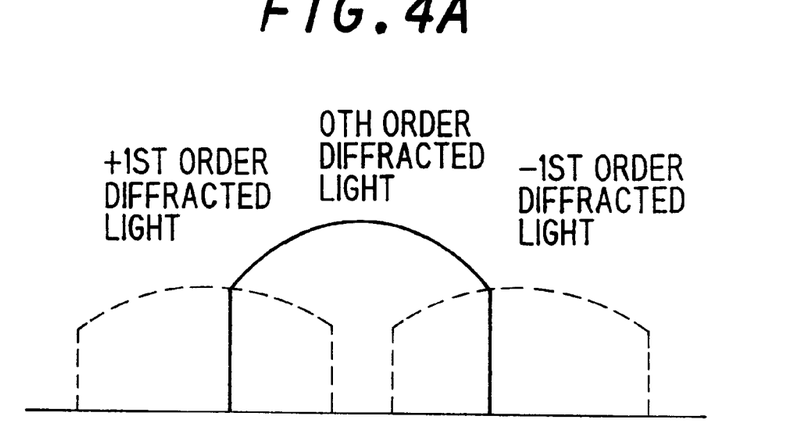
FIGS. 4A to 4C show a principle of the embodiment of the invention.

As shown in FIG. 4A, the light reflected from the optical disk having a guiding groove with a periodic configuration can be represented as a superposition of the three diffracted lights, which are arranged at a certain interval along the tracking direction.

When the focal point of the incident light is on the optical disk, each of the diffracted lights has amplitude and phase distributions similar to those of the incident light on the objective lens. Explaining concretely, the amplitude distribution of the former is given as the product of that of the latter and a certain factor, and the phase distribution of the former is given as the difference between that of the latter and a certain phase angle.

In case that the widths of the land and groove tracks are the same, the intensities of the −1st, 0th and +1st order diffracted lights are independent of whether the focussed spot is on the land or groove track, but the phase angles of the −1st and +1st order diffracted lights relative to that of the 0th order diffracted light is inverted dependently on whether the focussed spot is on the land or groove track. However, as shown in FIG. 4B, the resultant light intensity distribution on the objective lens is independent of the position of the focussed spot.

Figure 4B:
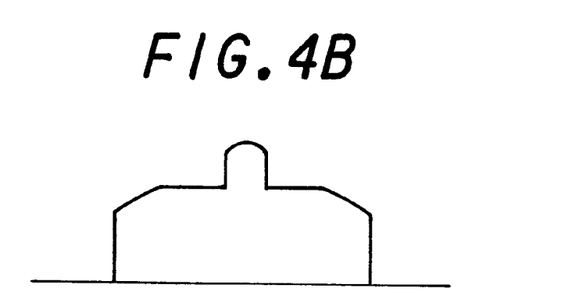

Accordingly, whether the focussed spot is on the land or groove track cannot be discriminated based on the light intensity distribution shown in FIG. 4B.

On the other hand, in case that the optical disk is slightly deviates from the focal point within a range of the depth of a focus of the objective lens, the intensity distribution of the respective lights diffracted by the optical disk are almost unchanged, but their phrase distributions are changed in the cross section of the diffracted lights.

In such a case, the phase distribution on the respective diffracted lights depend on whether the spot is on the land or groove track.

Figure 4C:
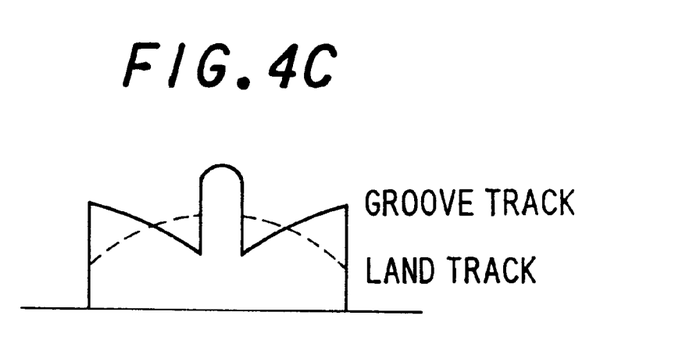

Accordingly, the intensity distribution of the total reflected light from the optical disk shows different fashions dependently on whether the spot is on the land or groove track, as shown in FIG. 4C. In this drawing, a real line shows the intensity distribution of the total reflected light in case that the spot is on the groove track, and a broken line shows that in case that the spot is on the land track.

So that, if the inner or outer portion of the intensity distribution of the total reflected light shown in FIG. 4C is selectively detected, whether the spot is on the land or groove track can be discriminated based on change of the level of the detected light.

The aforementioned change of the level of the detected light can be observed in case that the widths of the land and groove tracks are the same also, and whether the spot is on the land or groove track can be discriminated based on the aforementioned phenomenon, which has been never achieved by the conventional methods.

The embodiments of the invention will be explained in more detail referring to the appended drawings.

Figure 3:
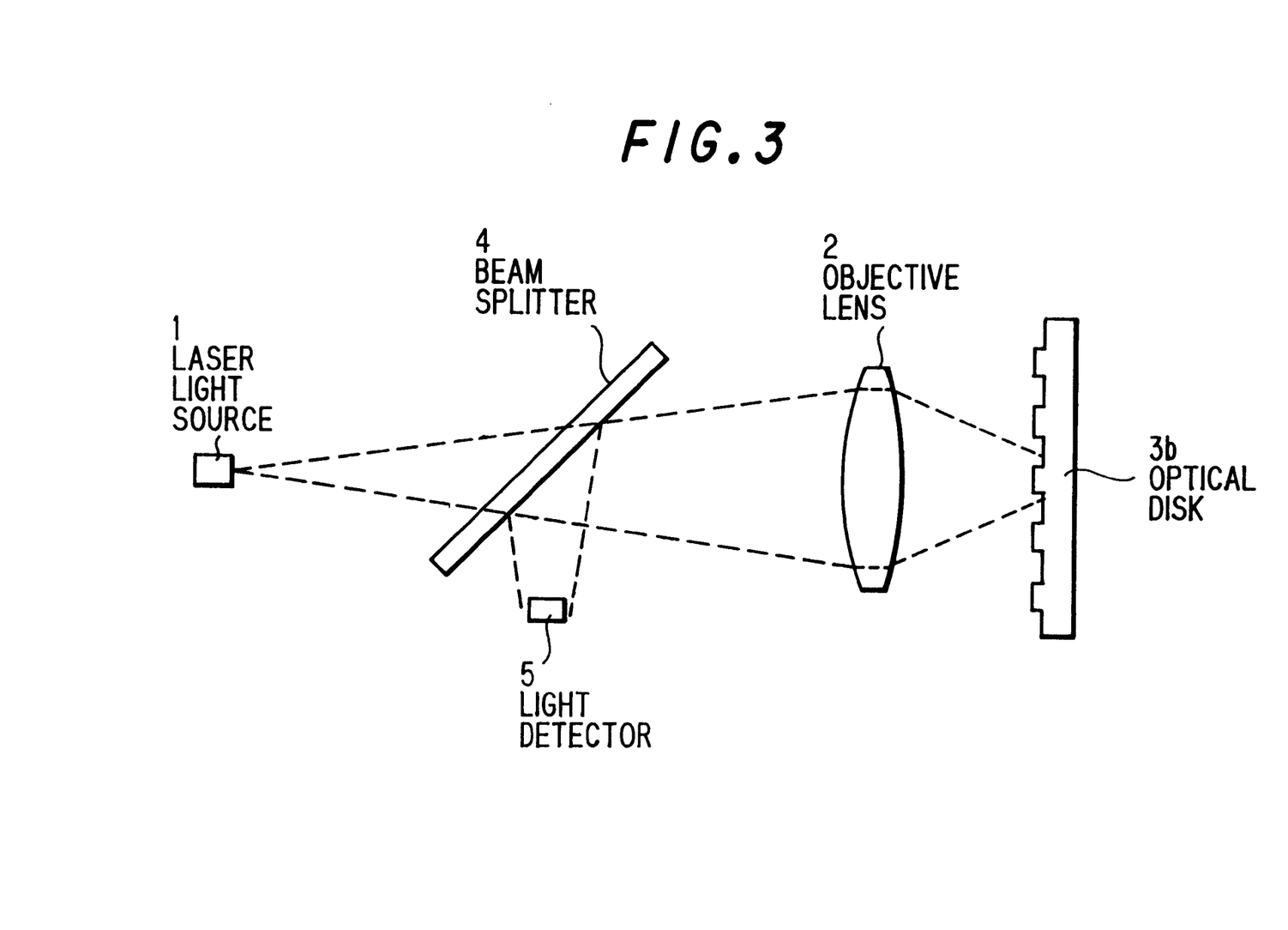
FIG. 3 shows a structure of an embodiment of the invention.

FIG. 3 shows a structure of a preferred embodiment of the invention. In this drawing, a laser light emitted from a laser light source 1 is focussed on an optical disk 3b provided with a guiding groove by and objective lens 2. A reflected light from the optical disk 3b is separated by a beam splitter 4 and received by a light detector 5.

Figure 5:
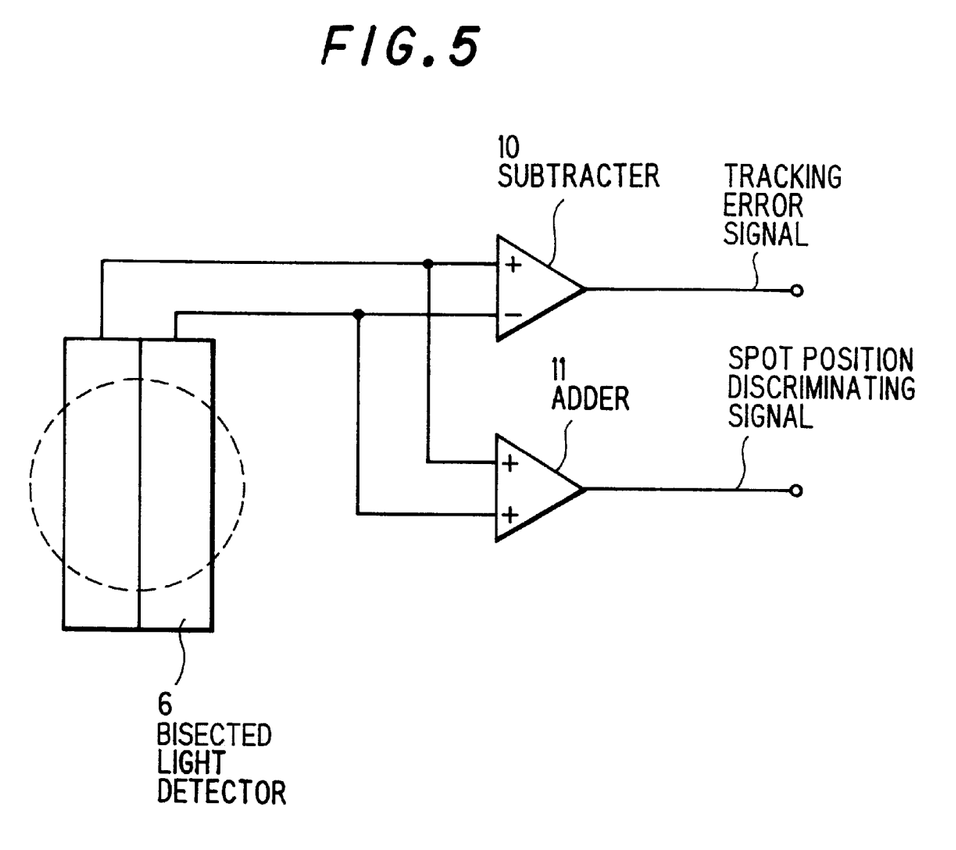
FIG. 5 is a circuit diagram for explaining a structure of an embodiment of the invention, FIGS. 6A and 6B explain a principle of the embodiment of the invention.
Figure 6A:
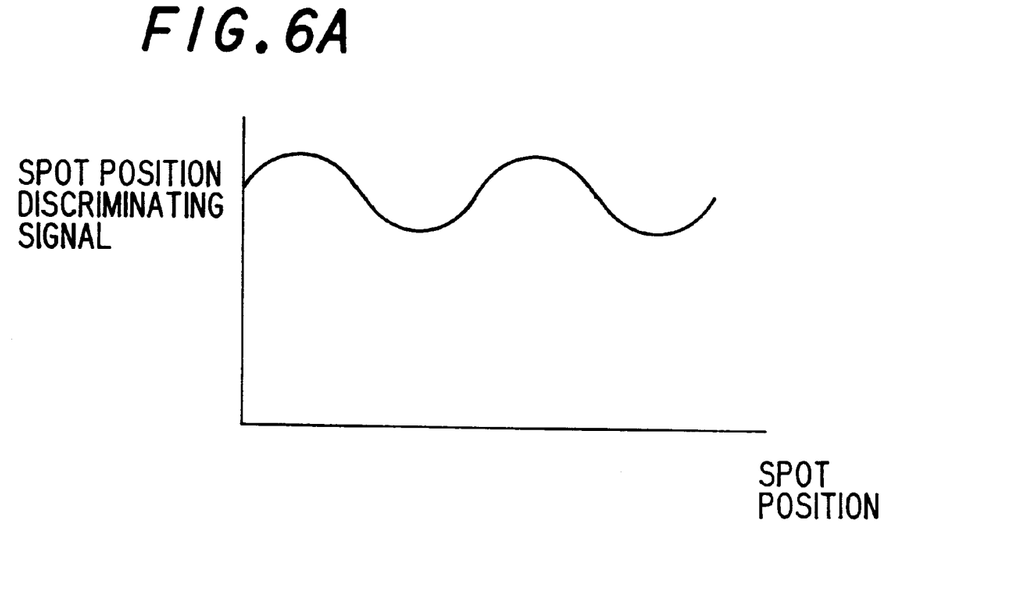
Figure 6B:
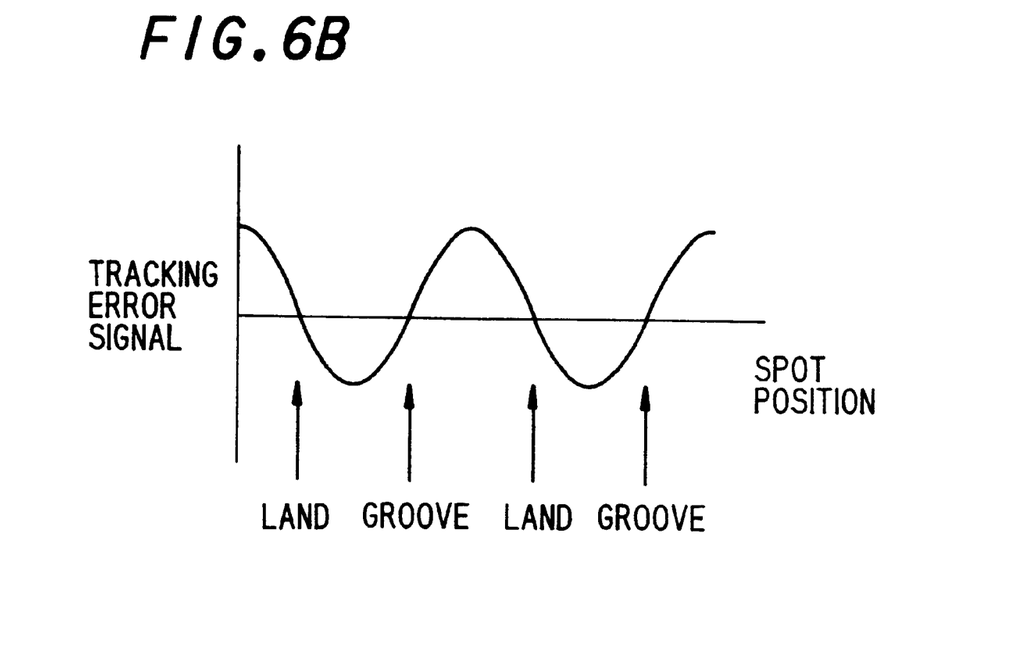

As shown in FIG. 5, the light detector 5 has a bisected configuration and receives only a light in a nearly central portion of the reflected light from the spot on the optical disk. The width of the bisected light detector 6 is narrower than that of the reflected light to be received in the direction perpendicular to the guiding groove. The bisected light detector 6 is divided into two equal detectors by a line running in parallel with the direction of the guiding groove. As shown in FIG. 6B, the differential signal derived from the output signals of the bisected light detector 6 (the output signal of the subtracter 10) serves as a tracking error signal, which corresponds to that obtained by a conventional push-pull method. Moreover, as shown in FIG. 6A, a sum signal derived from the output signals of the bisected detector 6 (the output signals of the adder 11) serves as a signal for discriminating whether the spot is on the land or groove track, if the spot on the optical disk is slightly defocused.

As mentioned in the above, the advantage of the light detector with the aforementioned configuration is that the tracking error signal and the spot position-discriminating signal can be simultaneously obtained.

Figure 7:
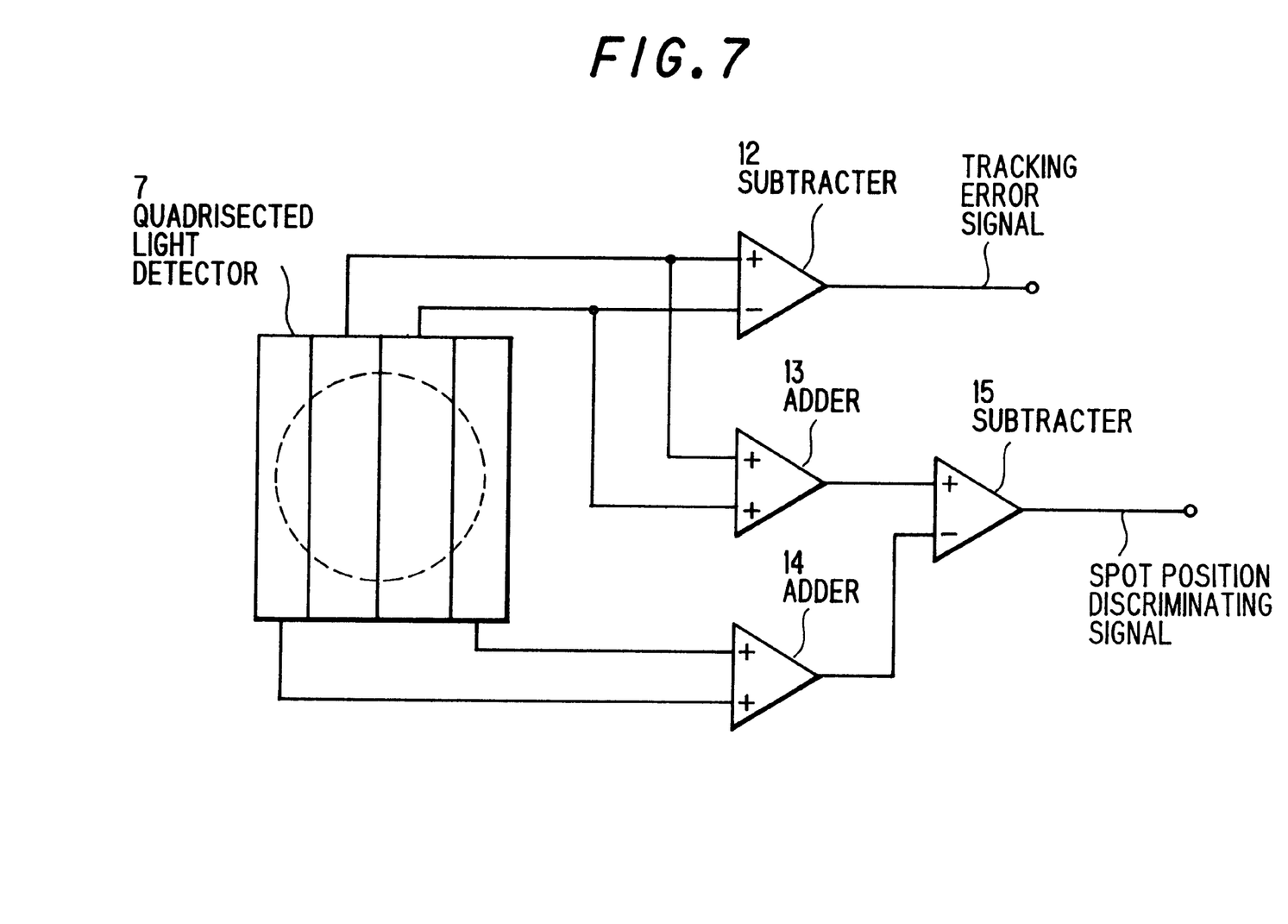
FIG. 7 is a circuit diagram for explaining a structure of another embodiment of the invention.

As shown in FIG. 7, the quadrisected light detector can be used as the light detector 5 also. The quadrisected light detector 7 is subdivided into four equal detectors by three lines running in parallel with the direction of the guiding groove. The position of the spot can be discriminated based on the difference between the lights received by the two inner subdivided detectors and that detected by two outer subdivided detectors. The tracking error signal can be obtained as the difference between the lights respectively received by the two inner subdivided detectors (the output signal of the subtracter 12). Furthermore, the tracking error signal can be obtained as the difference between the lights received by the right half of the light detector and that received by the left half of the same also. On the other hand, the spot position-discriminating signal can be obtained as the difference between the light received by the two inner subdivided detectors and that received by the two outer subdivided detectors also (the difference between the output signal of the adder 13 and that of the adder 14).

Figure 8A:
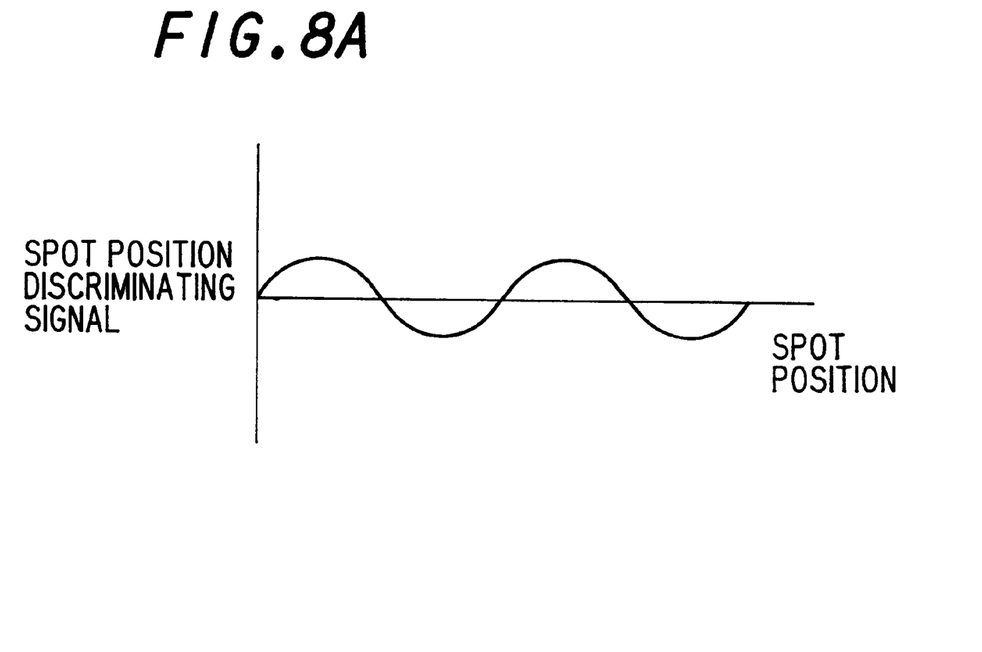
FIGS. 8A and 8B are curves showing signals obtained in the embodiment as shown in FIG. 7.
Figure 8B:
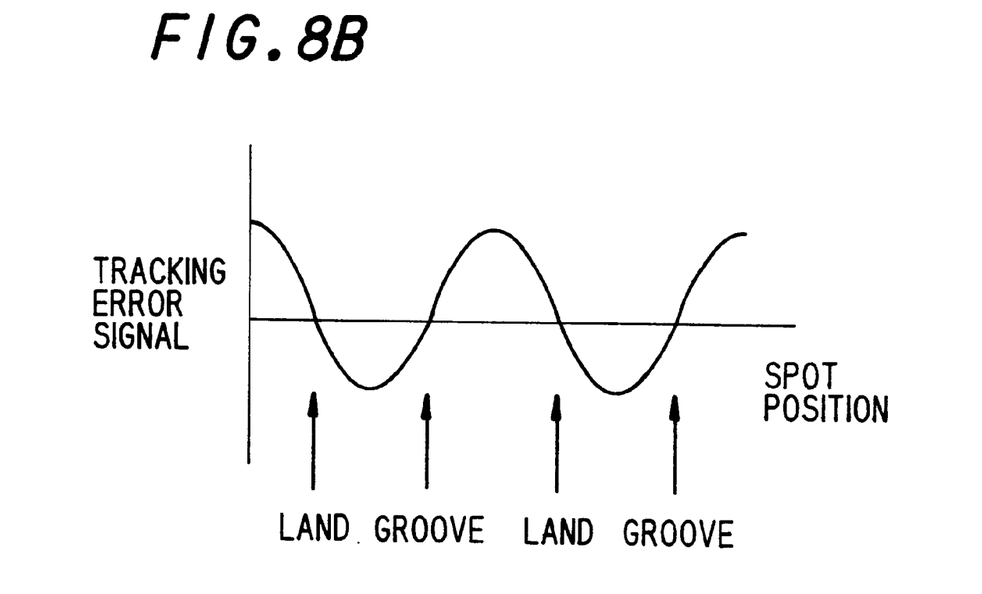

In operation, a spot position discriminating signal is obtained at the output of the subtracter 15 as shown in FIG. 8A, and a tracking error signal is obtained at the output of the subtracter 12 as shown in FIG. 8B.

A shown in FIGS. 8A to 8B, the spot position discriminating signal becomes a sinusoidal signal varying around zero by suitably selecting the widths of the subdivided detector.

In the above description, although explanation has been given for case that optical disk is provided with the guiding groove, a similar procedure is possible in case that the optical disk is provided with a pit series in stead of the guiding groove.

As mentioned in the above, according to the invention, since the difference in the intensity distribution of the reflected light from the optical disk between the land and groove tracks is detected through the output signals of the subdivided detectors in the light detector in a condition that the spot on the optical disk is slightly defocused, the rewritable optical disk system can discriminate whether the spot is on the land or groove track even in case that the widths of the land and groove tracks are the same.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A spot position discriminating system comprising:

means for forming a spot by focussing a laser light on an optical disk provided with a guiding groove by means of an objective lens, a light detector for partially detecting a light in a cross-section of a reflected light from said optical disk in a condition that said spot on said optical disk is defocused within a range of a depth of a focus of said objective lens, and means for discriminating whether said spot is on a land track or a groove track by detecting a difference in said light detected by said light detector between a land track and groove tracks.

2. A spot position-discriminating system according to claim 1, wherein:

said light detector is a bisected light detector, which has a narrower width than that of said reflected light in a direction perpendicular to said guiding groove and is divided into two equal detectors by a line running in parallel with a direction of said guiding groove.

3. A spot position-discriminating system according to claim 1, wherein:

said light detector is a quadriseced light detector, which is divided into four equal detectors by three lines running in parallel with a direction of said guiding groove, wherein an output signal of said light detector is given as a difference between a light detected by said two inner divided detectors and that detected by said two outer divided detectors.

4. A method for discriminating a spot position comprising the steps of:

arranging a quadrisected light detector close to an optical disk with a guiding groove, said quadrisected light detector being divided into four equal detectors by three lines running in parallel with a direction of said guiding groove, focussing a spot on said optical disk in a condition that said spot is defocused within a range of a depth of a focus of an objective lens, deriving a first sum signal obtained as a sum of output signals of said two inner divided detectors, deriving a second sum signal obtained as a sum of output signals of said two outer divided detectors, deriving a differential signal obtained as a difference between said first and second sum signals, and discriminating whether said spot is on a land track or a groove track based on said differential signal.

* * * * *